US009562631B2

(12) United States Patent
Ek et al.

(10) Patent No.: US 9,562,631 B2
(45) Date of Patent: Feb. 7, 2017

(54) POLYMER COMPOSITION FOR CROSSLINKED ARTICLES

(75) Inventors: Carl-Gustaf Ek, Västra Frölunda (SE); Magnus Palmlöf, Västra Frölunda (SE); Floran Prades, Linz (AT)

(73) Assignee: BOREALIS AG, Vienna (AT)

( * ) Notice: Subject to any disclaimer, the term of this patent is extended or adjusted under 35 U.S.C. 154(b) by 403 days.

(21) Appl. No.: 13/322,287

(22) PCT Filed: May 20, 2010

(86) PCT No.: PCT/EP2010/056939
§ 371 (c)(1),
(2), (4) Date: Feb. 1, 2012

(87) PCT Pub. No.: WO2010/136374
PCT Pub. Date: Dec. 2, 2010

(65) Prior Publication Data
US 2012/0123013 A1    May 17, 2012

(30) Foreign Application Priority Data
May 26, 2009 (EP) .................... 09161092

(51) Int. Cl.
| | |
|---|---|
| C08J 3/24 | (2006.01) |
| C08K 5/14 | (2006.01) |
| C08L 23/04 | (2006.01) |
| F16L 9/12 | (2006.01) |
| C08L 23/08 | (2006.01) |
| C08L 23/06 | (2006.01) |
| C08F 2/38 | (2006.01) |
| C08F 220/06 | (2006.01) |
| C08F 220/18 | (2006.01) |

(52) U.S. Cl.
CPC .. *F16L 9/12* (2013.01); *C08J 3/24* (2013.01); *C08L 23/0815* (2013.01); *C08F 2/38* (2013.01); *C08F 220/06* (2013.01); *C08F 220/18* (2013.01); *C08J 2323/04* (2013.01); *C08K 5/14* (2013.01); *C08L 23/04* (2013.01); *C08L 23/06* (2013.01); *C08L 2205/02* (2013.01); *C08L 2314/02* (2013.01)

(58) Field of Classification Search
CPC ....... C08J 3/24; C08J 2323/04; C08J 2323/06; C08J 2323/08; C08L 23/04; C08L 23/06; C08L 23/0815; C08L 2312/00; C08L 2312/06; C08K 5/14
USPC ......... 525/333.7, 333.8, 387; 526/348, 348.2
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil | |
| 3,405,109 A | 10/1968 | Rohlfing | |
| 4,582,816 A | 4/1986 | Miro | |
| 4,668,463 A * | 5/1987 | Cancio et al. | 264/556 |
| 5,262,503 A * | 11/1993 | Gotoh | 526/336 |
| 5,391,654 A | 2/1995 | Ahvenainen | |
| 5,519,098 A | 5/1996 | Brown | |
| 6,111,156 A | 8/2000 | Oballa | |
| 6,369,129 B1 * | 4/2002 | Martensson | C08L 23/04 523/173 |
| 6,376,595 B1 * | 4/2002 | Palmlof | 524/495 |
| 6,723,677 B1 | 4/2004 | Estrada | |
| 6,867,160 B1 | 3/2005 | Estrada | |
| 6,878,658 B2 | 4/2005 | Jaber | |
| 2004/0009314 A1 * | 1/2004 | Ahlgren et al. | 428/34.9 |
| 2004/0219317 A1 * | 11/2004 | Belcher | 428/35.7 |
| 2008/0051534 A1 | 2/2008 | Wang | |
| 2008/0226858 A1 * | 9/2008 | Walter et al. | 428/36.9 |
| 2008/0317990 A1 * | 12/2008 | Runyan | C08L 23/06 428/36.9 |
| 2010/0093956 A1 * | 4/2010 | Mihan et al. | 526/126 |
| 2010/0181095 A1 * | 7/2010 | Smedberg et al. | 174/120 SC |

FOREIGN PATENT DOCUMENTS

| | | | |
|---|---|---|---|
| CA | 2193431 A1 | 6/1998 | |
| CA | 2368646 A1 | 7/2003 | |
| EP | 0307205 A2 | 3/1989 | |
| EP | 0369436 A2 | 5/1990 | |
| EP | 0479186 A2 | 4/1992 | |
| EP | 0503791 A1 | 9/1992 | |
| EP | 0517868 B1 | 11/1995 | |
| EP | 0688794 A1 | 12/1995 | |
| EP | 0606303 B1 | 1/1997 | |
| EP | 0810235 A2 | 12/1997 | |
| EP | 0881237 A1 | 12/1998 | |
| EP | 0891990 A2 | 1/1999 | |
| EP | 0782587 B1 | 2/1999 | |
| EP | 0949280 A1 | 10/1999 | |
| EP | 0885255 B1 | 10/2001 | |
| EP | 0969916 B1 | 6/2002 | |

(Continued)

OTHER PUBLICATIONS

JP 11-322951, Nov. 1999, machine translation.*
Handbook of Petrochemicals Production Processes, Robert A. Meyers, 2005 McGraw-Hill Companies, Inc, see Chapter 14.10, pp. 14.131-14.138.
Rauwendaal: Polymer Extrusion (Hanser, 1986), chapters 10.3 to 10.5, pp. 460 to 489.

(Continued)

*Primary Examiner* — Roberto Rabago
(74) *Attorney, Agent, or Firm* — Banner & Witcoff, Ltd.

(57) ABSTRACT

The invention is directed to a use of a polymer composition comprising an ethylene polymer for producing a crosslinked article, a process for producing a crosslinked article and to a crosslinked article comprising a crosslinked polymer composition which comprises a crosslinked ethylene polymer.

11 Claims, No Drawings

(56) References Cited

FOREIGN PATENT DOCUMENTS

| | | |
|---|---|---|
| EP | 1310295 A1 | 5/2003 |
| EP | 1124864 B1 | 7/2003 |
| EP | 1415999 A1 | 5/2004 |
| EP | 1591459 A1 | 11/2005 |
| EP | 1591460 A1 | 11/2005 |
| EP | 1600276 A1 | 11/2005 |
| EP | 1633466 B1 | 3/2010 |
| JP | 07-048482 | 2/1995 |
| JP | 11-322951 * | 11/1999 |
| KR | 20080093723 A | 10/2008 |
| WO | 9212182 A1 | 7/1992 |
| WO | 9307189 A1 | 4/1993 |
| WO | 9618662 A1 | 6/1996 |
| WO | 9726297 A1 | 7/1997 |
| WO | 9732922 A2 | 9/1997 |
| WO | 9815591 A1 | 4/1998 |
| WO | 9903902 A1 | 1/1999 |
| WO | 9951646 A1 | 10/1999 |
| WO | 9957193 A1 | 11/1999 |
| WO | 0026258 A1 | 5/2000 |
| WO | 0155230 A1 | 8/2001 |
| WO | 02096962 A1 | 12/2002 |
| WO | 03106510 A1 | 12/2003 |
| WO | 2005103100 A1 | 11/2005 |
| WO | 2005118655 A1 | 12/2005 |
| WO | 2006089793 | 8/2006 |
| WO | 2007025640 A1 | 3/2007 |
| WO | 2008097732 A1 | 8/2008 |
| WO | WO 2008/125208 A3 * | 10/2008 |
| WO | 2009002653 A1 | 12/2008 |
| WO | 2009007117 | 1/2009 |
| WO | 2009007118 | 1/2009 |
| WO | WO 2009/007118 A1 * | 1/2009 |

OTHER PUBLICATIONS

K. K. McAuley and J. F. McGregor: On-line Inference of Polymer Properties in an Industrial Polyethylene Reactor, AIChE Journal, Jun. 1991, vol. 37, No, 6, pp. 825-835.

International Search Report and Written Opinion mailed Jul. 13, 2010 (PCT/EP2010/056939): ISA/EP.

Chodak; I: "Properties of crosslinked polyolefin-based materials" Progress in Polymer Science, Pergamon Press, Oxford, GB, vol. 20, No. 6, Jan. 1, 1995 (Jan. 1, 1995), pp. 1165-1199, XP022703703 ISSN: 0079-6700 [retrieved on Jan. 1, 1995] the whole document.

* cited by examiner

POLYMER COMPOSITION FOR CROSSLINKED ARTICLES

CROSS-REFERENCE TO RELATED APPLICATIONS

The present application is a U.S. National Phase filing of International Application No. PCT/EP2010/056939, filed on May 20, 2010, designating the United States of America and claiming priority to European patent application No. 09161092.3, filed May 26, 2009, and this application claims priority to and the benefit of the above-identified applications, which are both incorporated by reference herein in their entireties.

TECHNICAL FILED

The present invention is directed to a use of a polymer composition for producing a crosslinked article, to method for preparing a crosslinked article and to crosslinked articles.

BACKGROUND ART

It is well known that crosslinking of polymers, e.g. polyolefins, substantially contributes to an improved heat and deformation resistance, creep properties, mechanical strength, chemical resistance and abrasion resistance of a polymer. Therefore crosslinked polymers are widely used in different end applications, such as in pipe applications. In a crosslinking reaction of a polymer i.a. interpolymer crosslinks (bridges) are primarily formed. Crosslinking can be effected by radical reaction using i.a. irradiation or free radical generating agents, such as peroxides, which both free radical forming methods are well documented in the literature. An alternative crosslinking technology is e.g. so-called silane crosslinking technology, wherein silane groups are introduced to the polymer by copolymerisation or grafting and the crosslinking is effected by first hydrolysing silane groups which then crosslink in the presence of a crosslinking catalyst as described in patent WO2002096962.

Ethylene polymer is one of the commonly used polymers for crosslinking. It is known that certain properties of ethylene polymer, including properties which can have an effect on the crosslinking efficiency, i.a. on crosslinking rate and degree, may vary i.a. depending on
- the type of polymerisation process, such as high pressure polymerisation or a low pressure polymerisation process,
- process conditions, and,
- especially in case low pressure polymerisation, the catalyst used in the process. For instance polyethylene has typically a characteristic molecular weight distribution (MWD=Mw/Mn), comonomer distribution, so-called long chain branching (LCB) and/or degree of unsaturation depending on the type of the catalyst, such as Ziegler Natta, Cr or single site catalyst, used in polymerisation. Of these variable properties i.a. MWD, and degree of unsaturation may have an effect on the crosslinking efficiency.

The degree of unsaturation, e.g. the amount of double bonds between two carbon atoms (referred herein as carbon-carbon double bonds), e.g. —CH=CH— or vinyl, i.e. $CH_2$=CH—, moiety, present in the ethylene polymer is known to contribute to the crosslinking efficiency of the ethylene polymer, especially when crosslinking by radical reaction.

Normally, ethylene polymer which is polymerised using Ziegler Natta catalyst has a low degree of unsaturation (typically less than 0.18 vinyls/100° C.). Moreover, typical Ziegler Natta based ethylene polymers are lack of measurable LCB. Therefore ethylene polymer produced using Ziegler Natta catalyst has not been used for crosslinked articles.

Also ethylene polymers produced using conventional single site catalyst have typically a low degree of unsaturation and, furthermore, have usually a narrow MWD which sacrifices the processing of the polymer. Specific single site catalysts are also known in the prior art which produce ethylene polymer with vinyl groups and with Long Chain Branching (LCB). E.g. WO2005103100 of Basell, describes a single site catalyst which provides an ethylene polymer which has more than 0.5 vinyl groups/1000 carbon atoms and also LCB and can be further modified, e.g. crosslinked. Another specific single site catalyst, so called Constrained Geometry Catalyst (CGC), polymerises polyethylene which contains LCB and can be crosslinked, see e.g. in WO9726297 and EP885255 of Dow.

Therefore ethylene polymers produced using Cr catalyst (referred herein as Cr polyethylene), have conventionally been used in crosslinked articles, since Cr catalyst provide relative high degree of unsaturation to the resulting polyethylene (typically more than 0.5 vinyls/100° C.) and are industrially processable.

The current Cr polyethylene has i.a. the drawback that the MWD is very broad. As a consequence the typical Cr polyethylene contains a considerable low molecular weight (Mw) fraction which decreases the mechanical properties, such as strength, of the polymer and also decreases the crosslinking efficiency, since very low molecular weight chains do not provide sufficient crosslinking. The low Mw fraction can also provide inhomogeneities to the Cr polyethylene product which affect adversely to the processability of the polymer and to the quality of the final product. Moreover, the low Mw fraction may cause smoke and fume problems during the processing thereof as well as taste and odour (T&O) problems to the final product. The Cr polyethylene is conventionally produced in a unimodal process which usually limits the tailoring of the Mw and thus MWD.

Low density polyethylene produced in a high pressure process (referred herein as LDPE) is highly branched and can also have beneficial unsaturation for crosslinking. Therefore also LDPE has been used for crosslinking of articles i.a. in applications where "softer" low density polyethylene is desired.

One further known means to increase the unsaturation and thus crosslinking efficiency is to polymerise ethylene together with polyunsaturated comonomers, such as dienes, and/or to add crosslinking promoting agents. However, both means increase the complexity and cost of the production process of the crosslinked article.

There is a continuous need in the polymer field to find alternative polymer solutions suitable for demanding crosslinkable polymer applications, and particularly, where the crosslinked articles must meet high requirements and stringent authority regulations.

OBJECTS OF THE INVENTION

One of the objects of the present invention is to provide a use of an alternative polymer for producing crosslinked articles, preferably by radical reaction using irradiation or free radical generating agents, or both, a preparation process for producing a crosslinked article, wherein the alternative polymer is used and subsequently crosslinked, and also a crosslinked article comprising the alternative polymer in crosslinked form. The molecular weight distribution (MWD) of the alternative polymer for the crosslinked article of the invention is not limited and thus the polymer can be unimodal or multimodal with respect to MWD. More over the density of the alternative polymer is not limited, whereby crosslinked articles for various end applications can be produced.

The present invention thus broadens the product window of crosslinked articles and enables further tailored solutions to meet the increasing demands of polymer product producers and quality requirements set for the final products.

More preferably, the present invention provides a solution which solves the prior art problems.

SUMMARY OF THE INVENTION

According to claim 1 the invention is directed to a use of a polymer composition comprising an ethylene polymer for producing a crosslinked article, wherein the ethylene polymer is obtainable by polymerising ethylene optionally together with one or more comonomer(s) in the presence of a Ziegler-Natta catalyst
and wherein the polymer composition contains carbon-carbon double bonds
and has a crosslinkability expressed as a gel content of at least 50 weight-% (wt %) when measured from a disc sample of the crosslinked polymer composition (ASTM D 2765-01, Method A, decaline extraction).

The "polymer composition of the invention" is referred herein also as the Polymer composition.

The "ethylene polymer" means herein polyethylene and covers ethylene homopolymer or a copolymer of ethylene with one or more comonomer(s) (i.e. ethylene homo- or copolymer). "Ethylene polymer obtainable by polymerising ethylene in the presence of a Ziegler Natta catalyst" is referred herein later shortly and interchangeably as "ZN polyethylene" or "unsaturated ZN polyethylene".

Unless otherwise stated, the term "crosslinkability" means the achievable crosslinking degree of the Polymer composition, expressed as the gel content, when measured from a disc sample consisting of the crosslinked Polymer composition according to the procedure as given under "Gel content" method described below under "Determination methods".

In general herein below and claims, the gel content has been defined for the Polymer composition or for the article of the invention, as stated in the context, and determined according to ASTM D 2765-01, Method A, using decaline for the extraction. Moreover, unless otherwise stated, the gel content for the Polymer composition is determined from a disc sample consisting of the crosslinked Polymer composition. Said disc sample is made according to procedure as given in "Gel content" method described below under "Determination methods". Unless otherwise stated, the disc sample is crosslinked using 0.4 wt % of a peroxide, preferably a peroxide as specified under below "Gel content" method. The article of the invention has been defined by determining the gel content of the crosslinked article as such or, preferably, by determining the gel content of the Polymer composition used in the article, as stated in the context. In case the article is defined by giving the gel content of the Polymer composition used in the article, then, unless otherwise stated, the gel content is measured from a disc sample of the crosslinked polymer composition as explained above. In case of an irradiation crosslinked article embodiment as described later below, the Polymer composition used in the article can be defined by giving the gel content measured from a disc sample of the crosslinked Polymer composition or, alternatively, the gel content of the Polymer composition can be defined from the article sample prepared and irradiation crosslinked as defined below in "Gel content" method described under "Determination methods".

In case the article is defined by means of the gel content of the crosslinked article as such, then it is determined again by decaline extraction according to ASTM D 2765-01, Method A, but using a crosslinked Polymer composition sample taken from the crosslinked article.

The invention independently provides further the use of a polymer composition comprising an ethylene polymer for producing a crosslinked article as claimed in claim 2, wherein the ethylene polymer is obtainable by polymerising ethylene optionally together with one or more comonomer(s) in the presence of a Ziegler-Natta catalyst
and wherein the polymer composition contains carbon-carbon double bonds in an amount of more than 0.2 carbon-carbon double bonds/1000 carbon atoms measured by FT IR.

Preferably, the invention provides the use of a polymer composition, comprising an ethylene polymer for producing a crosslinked article, wherein the ethylene polymer is obtainable by polymerising ethylene optionally together with one or more comonomer(s) in the presence of a Ziegler-Natta catalyst
and wherein the polymer composition contains carbon-carbon double bonds in an amount of more than 0.2 carbon-carbon double bonds/1000 carbon atoms measured by FT IR
and has a crosslinkability expressed as a gel content of at least 50 wt %, when measured from a disc sample of the crosslinked polymer composition (ASTM D 2765-01, Method A, decaline extraction).

Preferably, the polymer composition contains of at least 0.3 carbon-carbon double bonds/1000 carbon atoms, preferably of at least 0.4 carbon-carbon double bonds/1000 carbon atoms, more preferably of at least 0.5 carbon-carbon double bonds/1000 carbon atoms. The upper limit of the amount of carbon-carbon double bonds present in the polymer composition is not limited and may preferably be less than 5.0/1000 carbon atoms, preferably less than 3.0/1000 carbon atoms measured by FT IR. Preferably the polymer composition contains of at least 0.19 vinyl groups/1000 carbon atoms, preferably of at least 0.2 vinyl groups/1000 carbon atoms, preferably of at least 0.3 vinyl groups/1000 carbon atoms, preferably of at least 0.4 vinyl groups/1000 carbon atoms, more preferably of at least 0.5 vinyl groups/ 1000 carbon atoms measured by FT IR. Preferably, the total amount of vinyl groups is lower than 4.0/1000 carbon atoms measured by FT IR.

The term "vinyl group" means herein above and below $CH_2=CH-$ groups which are measured by FT IR according to "Amount of Unsaturation" as defined below under "Determination methods".

More preferably, contrary to the prior art teaching, it has now been found that ZN polyethylene which is unsaturated has unexpectedly good crosslinking efficiency indicated i.a. by crosslinking rate and by degree of crosslinking. The expression "unsaturated" means herein carbon-carbon double bonds as described above and which are present in the backbone, or in an optional branch, or in both, of unsaturated ZN polyethylene molecule.

Thus preferably, the ZN polyethylene contains said carbon-carbon double bonds of the Polymer composition. I.e. said double bond content preferably originates from ZN polyethylene.

Accordingly, the invention is directed also to a use of a polymer composition comprising an ethylene polymer for producing a crosslinked article, wherein the ethylene polymer is obtainable by polymerising ethylene optionally together with one or more comonomer(s) in the presence of a Ziegler-Natta catalyst
and wherein the ethylene polymer contains carbon-carbon double bonds
and the polymer composition has a crosslinkability expressed as a gel content of at least 50 wt % when measured from a disc sample of the crosslinked polymer composition (ASTM D 2765-01, Method A, decaline extraction). This is also the preferable embodiment of the polymer composition defined in claim 1.

The invention is independently directed further to a use of a polymer composition comprising an ethylene polymer for producing a crosslinked article, wherein the ethylene polymer is obtainable by polymerising ethylene optionally together with one or more comonomer(s) in the presence of a Ziegler-Natta catalyst
and wherein the ethylene polymer contains carbon-carbon double bonds in an amount of more than 0.2 carbon-carbon double bonds/1000 carbon atoms measured by FT IR. This is also the preferable embodiment of the polymer composition defined in claim 2.

More preferably the invention provides the use of a polymer composition, comprising an ethylene polymer for producing a crosslinked article, wherein the ethylene polymer is obtainable by polymerising ethylene optionally together with one or more comonomer(s) in the presence of a Ziegler-Natta catalyst
and wherein the ethylene polymer contains carbon-carbon double bonds in an amount of more than 0.2 carbon-carbon double bonds/1000 carbon atoms measured by FT IR and the polymer composition has a crosslinkability expressed as a gel content of at least 50 wt % when measured from a disc sample of the crosslinked polymer composition (ASTM D 2765-01, Method A, decaline extraction).

The expression "carbon-carbon double bonds" means herein the carbon-carbon double bonds present in the Polymer composition, or in case of the preferred embodiment, present in the ZN polyethylene, and which carbon-carbon double bonds originate from vinyl groups, vinylidene groups and trans-vinylene groups, when present in the Polymer composition, or preferably in the ZN polyethylene. Thus the "amount of carbon-carbon double bonds" as defined above or below means the total sum of vinyl-, vinylidene- and trans-vinylene-groups/1000 carbon atoms. Naturally, the Polymer composition, or in the preferred embodiment, the ZN polyethylene, does not necessarily contain all the above types of double bonds. However, any of the three types, if present, is calculated to the "amount of carbon-carbon double bonds". The amount of the carbon-carbon double bonds/1000 carbon atoms or vinyl groups/1000 carbon atoms in the above and below definitions is determined according to "Amount of Unsaturation" as described below under "Determination Methods" and referred herein above and below and in claims shortly as "measured by FT IR".

More preferably, the ZN polyethylene contains of at least 0.3 carbon-carbon double bonds/1000 carbon atoms, preferably of at least 0.4 carbon-carbon double bonds/1000 carbon atoms, more preferably of at least 0.5 carbon-carbon double bonds/1000 carbon atoms. The upper limit of the amount of carbon-carbon double bonds present in the ZN polyethylene is not limited and may preferably be less than 5.0/1000 carbon atoms, preferably less than 3.0/1000 carbon atoms.

More preferably, the ZN polyethylene ethylene polymer contains of at least 0.19 vinyl groups/1000 carbon atoms, preferably of at least 0.2 vinyl groups/1000 carbon atoms, preferably of at least 0.3 vinyl groups/1000 carbon atoms, preferably of at least 0.4 vinyl groups/1000 carbon atoms, more preferably of at least 0.5 vinyl groups/1000 carbon atoms measured by FT IR. Preferably, the total amount of vinyl groups is lower than 4.0/1000 carbon atoms measured by FT IR.

In one preferable embodiment, the ZN polyethylene contains of at least 0.2 vinyl groups per chain, preferably of at least 0.3, preferably of at least 0.5, more preferably of at least 0.6, more preferably of at least 0.7, more preferably of at least 0.8, even more preferably of at least 0.9, vinyl groups/chain. The upper limit is not limited and is preferably up to 4.0 vinyl groups/chain, more preferably up to 2.0. The amount of vinyl groups/chain is determined according to "Amount of Unsaturation" as described under "Determination Methods".

The degree of crosslinking obtained with the unsaturated ZN polyethylene, which preferably contains vinyl groups as defined above or below or in claims, is surprisingly high. Moreover the claimed unsaturation as such present in the ZN polyethylene of the invention provides a sufficient level of crosslinking, when the article comprising the ZN polyethylene is crosslinked. The crosslinking degree of ZN polyethylene is comparable to that of Cr polyethylene and also industrially feasible so that there is no need to increase the unsaturation by using polyunsaturated comonomers, such as dienes, or by grafting crosslinkable compounds. The desired degree of crosslinking can be achieved with conventionally used amounts of a free radical generating agent or irradiation. Moreover, at selected carbon-carbon double bond content, preferably the vinyl group content, within the range of the invention, the crosslinking level can be decreased or increased, depending on the desired end application, by adjusting the amount of free radical generating agent or irradiation.

In case of the preferred embodiment of the invention, wherein the claimed and preferred carbon-carbon double bonds, preferably vinyl groups, are present in the unsaturated ZN polyethylene, the Polymer composition may optionally contain, but need not, further functionalities other than carbon-carbon double bonds which contribute to the efficiency or degree of crosslinking, such as so-called crosslinking boosters, further polymer components which may contain copolymerised or grafted compounds containing crosslinkable groups and/or the unsaturated ZN polyethylene may, additionally to said carbon-carbon double bonds, preferably vinyl groups, contain copolymerised or grafted compounds containing crosslinkable groups.

Preferably, the unsaturated ZN polyethylene is polymerised without using any polyunsaturated comonomer which contains carbon-carbon double bonds. Also preferably, the unsaturated ZN ethylene polymer contains no grafted compounds which contain crosslinkable functional groups such as crosslinkable silane-groups.

Typically the unsaturation of the ZN polyethylene is provided during the polymerisation process in a known manner by adjusting the process conditions and/or by the choice of the Ziegler Natta catalyst without using any polyunsaturated comonomers.

Further preferably prior to crosslinking the ZN polyethylene is without any long chain branching (LCB). Preferably, the ZN polyethylene has prior crosslinking a melt flow ratio $MFR_{21}/MFR_2$ of less than 80, preferably of less than 65, even more preferably of less than 50. LCB means preferably herein long chain branching which is provided to a polyethylene by a catalyst other than ZN catalyst. More preferably, the ZN polyethylene prior to crosslinking does not contain LCB originating from a Constrained Geometry catalyst as discussed e.g. in EP885255 for so called SLEP polymers.

One advantage in the use of ZN polyethylene for producing crosslinked articles is that the MWD is not limited, but can be tailored depending on the needs. For instance, compared to the conventional Cr polyethylene, it is possible to use ZN polyethylene with narrow MWD for crosslinkable articles. In such embodiment such narrow MWD improves the crosslinking response. Moreover, odour and taste problems of prior art can preferably be decreased or even avoided by the use of ZN polyethylene in crosslinked articles.

Surprisingly, it has also been found that ZN polyethylene provides good crosslinking performance even with lower Mw polymer compared to Cr polyethylene.

Furthermore, without limiting to any theory it is believed that by increasing the Mn value of the ZN polyethylene i.a. the crosslinking degree can further be increased.

Preferably, ZN polyethylene has very advantageous processing performance, when compared e.g. to the polyethylene obtainable using a single site catalyst.

The unsaturated ZN polyethylene of the present invention is preferably used as the sole crosslinkable component for producing the crosslinked article.

The invention is also directed to a process for producing a crosslinked article of the invention as defined in claim 8 and as will be described in further details below.

The invention is further directed to a crosslinked article obtainable by the preparation process of the invention.

The invention is further directed to a crosslinked article produced by the preparation process of the invention.

The invention further provides independently a crosslinked first article as defined as a first alternative (i) in claim 11 comprising a crosslinked polymer composition which comprises a crosslinked ethylene polymer, wherein the ethylene polymer is obtainable by polymerising ethylene optionally together with one or more comonomer(s) in the presence of a Ziegler-Natta catalyst
and wherein the article has a crosslinking degree expressed as a gel content of at least 50 wt % (ASTM D 2765-01, Method A, decaline extraction), when measured from a crosslinked Polymer composition sample taken from the crosslinked article.

The invention further provides independently a second crosslinked article as defined as a second alternative (ii) in claim 11 comprising a crosslinked polymer composition which comprises a crosslinked ethylene polymer,
wherein the ethylene polymer is obtainable by polymerising ethylene optionally together with one or more comonomer(s) in the presence of a Ziegler-Natta catalyst
and wherein the polymer composition has a crosslinking degree expressed as a gel content of at least 50 wt % (ASTM D 2765-01, Method A, decaline extraction), when measured from a disc sample consisting of the crosslinked Polymer composition.

The invention further provides independently a third crosslinked article as defined as a third alternative (iii) in claim 11 comprising a crosslinked polymer composition which comprises a crosslinked ethylene polymer, wherein the ethylene polymer is obtainable by polymerising ethylene optionally together with one or more comonomer(s) in the presence of a Ziegler-Natta catalyst
and wherein the polymer composition, preferably the ethylene polymer, prior to crosslinking
contains carbon-carbon double bonds, preferably in an amount of more than 0.2 carbon-carbon double bonds/ 1000 carbon atoms measured by FT IR.

DETAILED DESCRIPTION

The preferable subranges, properties and embodiments of the ZN polyethylene of the invention are described below in generalisable terms and apply commonly and independently, in any combination, to the use of the ZN polyethylene for producing a crosslinked article, to the preparation process of a crosslinked article wherein the ZN polyethylene is used and to the crosslinked article wherein the ZN polyethylene is used and subsequently crosslinked. If not specified in the description part, then the measurement methods for the properties of the Polymer composition, of the ZN polyethylene and of the crosslinked article, as defined above or below, are described later below under "Determination methods".

ZN Polyethylene Prior Crosslinking

The below preferred ranges and further properties are described for the ZN polyethylene prior crosslinking, i.e. when used for producing a crosslinked article and for a crosslinked article prior (before) crosslinking the article.

The ZN polyethylene can be unimodal or multimodal with respect to the molecular weight distribution (MWD=Mw/Mn). The term "multimodal" means herein, unless otherwise stated, multimodality with respect to molecular weight distribution and includes also bimodal polymer. Generally, a polyethylene comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product. In case of a multimodal ZN polyethylene, the polymer comprises at least a lower weight average molecular weight (LMW) component (A) and a higher weight average molecular weight (HMW) component (B). Said LMW component has a lower molecular weight than the HMW component.

The ZN polyethylene has preferably a MWD of at least 2.5, preferably at least 2.9, preferably from 3 to 20, more preferably from 3.3 to 15, even more preferably from 3.5 to 10.

As mentioned above the ZN polyethylene can be an ethylene homopolymer or a copolymer of ethylene with one or more comonomers.

Comonomer as used herein means monomer units other than ethylene which are copolymerisable with ethylene.

The term "copolymer of ethylene with one or more comonomers" as used herein is preferably a copolymer of ethylene with one or more olefin comonomer(s), preferably polymers comprising repeat units deriving from ethylene and at least one other C3-20 alpha olefin monomer. Preferably, the ZN ethylene copolymer may be formed from ethylene together with at least one C4-12 alpha-olefin comonomer, more preferably with at least one C4-8 alpha-olefin comonomer, e.g. with 1-butene, 1-hexene or 1-octene. Preferably, the ZN ethylene copolymer is a binary copolymer, i.e. the polymer contains ethylene and one comonomer, or a terpolymer, i.e. the polymer contains ethylene and two or three comonomers. Preferably, ZN ethylene copolymer comprises an ethylene hexene copolymer, ethylene octene copolymer or ethylene butene copolymer. The amount of comonomer, if present, in ZN ethylene copolymer is preferably at least 0.25 mol-% relative to ethylene.

The density of the unsaturated ZN polyethylene can be varied widely depending on the end application.

The preferable ZN polyethylene can be selected from elastomers (POE), plastomers (POP), very low density ethylene copolymers (VLDPE), linear low density ethylene copolymer (LLDPE), medium density ethylene copolymers (MDPE) or high density ethylene homopolymer or copolymer (HDPE). These well known the types are named according to their density area.

Herein, the elastomers, plastomers and VLDPE cover the density range of from 855 to 914 kg/m$^3$. Elastomers have a density in the range of from 855 to 884 kg/m$^3$. Plastomers have a density in the range of from 855 to 904 kg/m$^3$. VLDPE has a density in the range of from 905 to 909 kg/m$^3$. The LLDPE has a density of from 910 to 930 kg/m$^3$, preferably of from 910 to 929 kg/m$^3$, more preferably of from 915 to 929 kg/m$^3$. The MDPE has a density of from 931 to 945 kg/m$^3$. The HDPE has a density of more than 946 kg/m$^3$, preferably form 946 to 977 kg/m$^3$, more preferably form 946 to 965 kg/m$^3$.

VLDPE, LLDPE, MDPE or HDPE are each equally preferable types of ZN polyethylene suitable for the present invention. More preferably, the ZN polyethylene is selected from any of the equally preferred LLDPE, MDPE or HDPE polymers as defined above.

In one preferable embodiment the ZN polyethylene is LLDPE or MDPE copolymer having a density as defined above, preferably LLDPE copolymer having a density as defined above, more preferably the ZN polyethylene is a LLDPE copolymer which has a density of from 910 to 930 kg/m$^3$, preferably of from 910 to 929 kg/m$^3$, more preferably of from 915 to 929 kg/m$^3$.

In equally preferable embodiments wherein a high density ZN polyethylene is desired, it is preferably a ZN ethylene homopolymer or a ZN ethylene copolymer having a density as defined above, preferably a HDPE homopolymer which has a density of more than 946 kg/m$^3$, preferably form 946 to 977 kg/m$^3$, more preferably from 946 to 965 kg/m$^3$.

In a most preferred embodiment the density of the ZN polyethylene is 950 kg/m$^3$ or less. In this embodiment the density of the ZN polyethylene is selected from VLDPE, LLDPE or MDPE, more preferably from LLDPE or MDPE, as defined above.

The ZN polyethylene has preferably an MFR$_2$ of from 0.01 to 200.0 g/10 min, preferably of from 0.05 to 150.0 g/10 min, preferably of from 0.1 to 20.0 g/10 min, more preferably of from 0.2 to 11.0 g/10 min. In some embodiments a MFR$_2$ of from 0.2 to 5.0 g/10 min is preferred. Preferable MFR$_5$ is of from 0.01 to 60.0 g/10 min, preferably of from 0.1 to 30.0 g/10 min. In some embodiments a MFR$_5$ of from 0.1 to 5.0 g/10 min is preferred. MFR$_{21}$ is preferably of from 0.1 to 50.0 g/10 min, preferably from 0.2 to 40.0 g/10 min. FRR$_{21/2}$ is preferably of less than 80, preferably of less than 65, more preferably of 15 to 60, even more preferably of from 15 to 35.

In preferable pipe applications wherein crosslinking is effected using a free radical generating agent, such as peroxide, the ZN polyethylene prior crosslinking has preferably an MFR$_2$ of from 0.01 to 5.0 g/10 min, preferably of 0.05 to 2.0 g/10 min, preferably from 0.2 to 1.4 g/10 min. MFR$_{21}$ of less than 40.0 g/10 min, preferably from 2 to 35.0 g/10 min and more preferably from 3 to 25 g/10 min. FRR$_{21/5}$ is preferably of up to 50, preferably of from 2 to 35, more preferably of from 10 to 30.

In preferable pipe applications wherein crosslinking is effected using irradiation, the ZN polyethylene prior crosslinking has preferably an MFR$_2$ of from 0.01 to 5.0 g/10 min, preferably of 0.05 to 2.0 g/10 min, preferably from 0.2 to 1.4 g/10 min. Preferably the MFR$_5$ value is in the range 0.1 to 2 g/10 min. MFR$_{21}$ is preferably of less than 40.0 g/10 min, preferably of less than 2 to 35 g/10 min, more preferably less than 20 g/10 min, especially 5 to 20 g/10 min.

The ZN polyethylene preferably has a number average molecular weight (Mn) of at least 7000, preferably of at least 10 000 g/mol, preferably of at least 15 000 g/mol, more preferably of at least 20 000 g/mol, more preferably of at least 25 000 g/mol, more preferably of from 25 000 to 250 000 g/mol, more preferably from 26 000 to 200 000 g/mol. Depending on the desired end application the upper limit of Mn of the ZN polyethylene can be tailored to be of up to 150 000 g/mol, preferably of up to 100 000 g/mol.

Further preferably, the ZN polyethylene has a weight average molecular weight (Mw) of at least 35 000 g/mol, preferably of from 75 000 g/mol to 800 000 g/mol, preferably of from 85 000 g/mol to 500 000 g/mol, more preferably from 90 000 g/mol to 300 000 g/mol. In one embodiment, depending on the desired end application, the Mw of from 90 000 g/mol to 200 000 g/mol, preferably of from 90 000 g/mol to 182 000 g/mol, of the ZN polyethylene can be preferred.

The invention is thus based on ZN polyethylene suitable for producing a crosslinked article and suitable in a crosslinked article, which polymer has advantageous properties and is produced by using one or more Ziegler Natta (ZN) catalyst(s). Preferably the ZN polyethylene is produced using ZN catalyst(s) as the sole catalyst(s). In case of a multimodal ZN polyethylene the ZN polyethylene comprises at least a LMW polymer (A) and a HMW polymer (B) which are preferably obtainable by using the same ZN catalyst(s). If the multimodal ZN polyethylene comprises further components, then all the components are preferably polymerised using the same ZN catalyst.

Optionally, the ZN polyethylene may also comprise e.g. up to 5 wt % of a well known polyethylene prepolymer which is obtainable from a prepolymerisation step as well known in the art, e.g. as described in WO9618662. In case of such prepolymer, the prepolymer component is typically comprised in the unimodal or in one of multimodal, e.g. LMW and HMW components, or alternatively forms a separate Mw fraction, i.e. further component, of the ZN polyethylene and thus contributes to the multimodality.

Preferably the prepolymer is polymerized using the same ZN catalyst as the unimodal or multimodal ZN polyethylene.

By ethylene homopolymer is meant a polymer which substantially consists of ethylene units. As the process streams may have a small amount of other polymerisable species as impurities the homopolymer may contain a small amount of units other than ethylene. The content of such units should be lower than 0.2% by mole, preferably less than 0.1% by mole.

The ZN polyethylene may also be multimodal with respect to comonomer and/or density distribution.

The ZN polyethylene suitable for the present invention is not critical and can be any ZN polyethylene provided that provides the crosslinkability, preferably by comprising carbon-carbon double bonds, preferably vinyl groups, as defined above, below, or in claims, and suitable for use producing crosslinked articles and in crosslinked articles. Such suitable ZN polyethylene polymers can e.g. commercially available or be produced according or analogously to conventional polymerisation processes which are well documented in the polymer literature.

As examples of commercial ZN polyethylene grades, i.a. VL or FG grades supplied by Borealis, such as VL4470 or FG5190; or SCLAIR® grades supplied by Nova Chemicals, such as SCLAIR® FP026-F: Density 926 kg/m$^3$, C2/C8, MFR$_2$ 0.8 g/10 min, SCLAIR® FP120series, e.g. SCLAIR®FP120-A: Density 920 kg/m$^3$, C2/C8, MFR$_2$ 1.0 g/10 min, SCLAIR® 14G: Density 936 kg/m$^3$, C2/C4, MFR$_2$ 0.72 g/10 min or SCLAIR® 19A: Density 962 kg/m$^3$, C2, MFR$_2$ 0.72 g/10, can be mentioned. According to home page of Nova Chemicals the SCLAIR grades are produced i.a. using so called SCLAIRTECH™ technology.

Polymerisation Process

The ZN polyethylene may be a unimodal with respect to the MWD. The unimodal ZN polyethylene can be obtainable by a single stage polymerisation in a single reactor in a well known and documented manner. Alternatively, the ZN polyethylene can be a multimodal (e.g. bimodal) which can be obtainable by blending mechanically together two or more separate polymer components or, preferably, by in-situ blending in a multistage polymerisation process during the preparation process of the polymer components. Both mechanical and in-situ blending are well known in the field. The multimodal ZN polyethylene is typically produced in a multistage polymerisation process in the presence of a single Ziegler Natta catalyst.

In the multistage polymerisation process ethylene and alpha-olefins having from 4 to 20 carbon atoms are polymerised in a process comprising at least two polymerisation stages. Each polymerisation stage may be conducted in a separate reactor but they may also be conducted in at least two distinct polymerisation zones in one reactor. Preferably, the multistage polymerisation process is conducted in at least two cascaded polymerisation stages.

Catalyst

The Ziegler-Natta polymerisation catalyst used for polymerising the ZN polyethylene of the invention is not critical and may be any ZN catalyst suitable for processes wherein polyethylene with crosslinkability, preferably containing carbon-carbon double bonds, preferably vinyl groups, are produced. Accordingly, Ziegler-Natta catalysts are one of the very well known and commonly used coordination catalysts for producing polymers and typically comprise a transition metal component and an activator. A typical example of ZN catalysts are those produced by activating titanium halides with organometallic compounds such as triethylaluminium.

More specifically, the transition metal component comprises typically a metal of Group 4 or 5 of the Periodic System (IUPAC) as an active metal. In addition, it may contain other metals or elements, like elements of Groups 2, 13 and 17.

Preferably and as mentioned above, the polymerisation catalyst contains a titanium compound, an aluminium compound and a magnesium compound. Such Ziegler-Natta catalysts can be homogenous Ziegler-Natta catalysts or, alternatively, heterogeneous, i.e. solid, Ziegler-Natta catalysts which may be a solidified or precipitated products of the starting materials or be supported on a particulate external support.

The titanium compound is usually a halogen containing titanium compound, preferably chlorine containing titanium compound. Especially preferred titanium compound is titanium tetrachloride.

The aluminium compound is typically aluminium alkyl. Especially preferred compounds are aluminium alkyl dichlorides.

The magnesium compound is typically a reaction product of a magnesium dialkyl, an alcohol and a chlorinating agent. The alcohol is conventionally a linear or branched aliphatic monoalcohol.

The particulate external support can be an inorganic oxide support, such as silica, alumina, titania, silica-alumina and silica-titania, or a magnesium based support, such as magnesium dichloride support.

One preferable catalyst can be prepared by sequentially contacting the carrier with the above mentioned compounds, as described in EP 688794 or WO 99/51646. Alternatively, it can be prepared by first preparing a solution from the components and then contacting the solution with a carrier, as described in WO 01/55230.

Other suitable Ziegler Natta catalysts contain a titanium compound together with a magnesium halide compound acting as a support. Thus, the catalyst contains a titanium compound on a magnesium dihalide, like magnesium dichloride. Such catalysts are disclosed, for instance, in WO 2005/118655 and EP 810235.

As still further preferable embodiment of Ziegler Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO2003/106510 of Borealis.

Activators

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Polymerisation

It is evident that the claimed unsaturation property of ZN polyethylene is as such very well known, but the claimed use thereof and the ZN polyethylene of the invention which is in crosslinked form in an article is novel and involves an inventive step due to surprising crosslinking efficiency. The unsaturation can be obtained by controlling the process conditions and optionally by choice of ZN catalyst, which, as said before, can be a conventional catalyst, as well known to a skilled person.

The ZN polyethylene may be produced in any suitable polymerisation process known in the art.

A unimodal ZN polyethylene can be produced e.g. in any of the below reaction zones and reactors, preferably in any of slurry, solution, or gas phase conditions. Into the polymerisation zone a catalyst, ethylene, optionally an inert diluent, and optionally a molecular weight regulating agent, such as hydrogen, and/or comonomer in a desired molar ratio to ethylene are introduced.

When preparing a multimodal ZN polyethylene, then into the polymerisation zone a catalyst, ethylene, optionally an inert diluent, and optionally hydrogen and/or comonomer are introduced. For instance a low molecular weight ethylene polymer component is preferably produced in a first polymerisation zone and the high molecular weight ethylene copolymer component is produced in a second polymerisation zone. The first polymerisation zone and the second polymerization zone may be connected in any order, i.e. the first polymerisation zone may precede the second polymerisation zone, or the second polymerisation zone may precede the first polymerisation zone or, alternatively, polymerisation zones may be connected in parallel. However, it is preferred to operate the polymerisation zones in cascaded mode. The polymerisation zones may operate in slurry, solution, or gas phase conditions or in any combinations thereof. Suitable reactor configurations are disclosed, among others, in WO-A-92/12182, EP-A-369436, EP-A-503791, EP-A-881237 and WO-A-96/18662. Examples of processes where the polymerisation zones are arranged within one reactor system are disclosed in WO-A-99/03902, EP-A-782587 and EP-A-1633466.

It is often preferred to remove the reactants of the preceding polymerisation stage from the polymer before introducing it into the subsequent polymerisation stage. This is preferably done when transferring the polymer from one polymerisation stage to another. Suitable methods are disclosed, among others, in EP-A-1415999 and WO-A-00/26258.

The polymerisation in the polymerisation zone is preferably conducted in slurry or solution, such as slurry. The catalyst can be fed e.g. in a conventional manner to the reactor. Then the polymer particles formed in the polymerisation, together with the catalyst fragmented and dispersed within the particles, are suspended in the fluid hydrocarbon. The slurry is agitated to enable the transfer of reactants from the fluid into the particles.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. Especially preferred diluents are i.a. isobutane or propane, possibly containing minor amount of methane, ethane and/or butane.

The ethylene content in the fluid phase of the slurry may be from 2 to about 50% by mole, preferably from about 3 to about 20% by mole and in particular from about 5 to about 15% by mole. The benefit of having a high ethylene concentration is that the productivity of the catalyst is increased but the drawback is that more ethylene then needs to be recycled than if the concentration was lower.

The unsaturated ZN polyethylene may be produced e.g. in the slurry polymerisation, whereby the higher polymerisation temperatures are known to provide unsaturation to the polymerised ZN polyethylene. The polymerisation in slurry reactor may typically be carried out from 50 to 115° C., preferably from 60 to 110° C. and in particular from 70 to 105° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. Alternatively, the polymerisation may be carried out in a loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

It is sometimes advantageous to conduct the slurry polymerisation above the critical temperature and pressure of the fluid mixture. Such operation is described in U.S. Pat. No. 5,391,654.

In such operation the temperature is typically from 85 to 110° C., preferably from 90 to 105° C. and the pressure is from 40 to 150 bar, preferably from 50 to 100 bar.

In case of a multimodal ZN polyethylene, the slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591459, EP-A-1591460 and WO-A-2007/025640. The continuous withdrawal is advantageously combined with a suitable concentration method, as disclosed in EP-A-1310295 and EP-A-1591460.

When producing a multimodal ZN polyethylene, if the low molecular weight ethylene polymer is produced in slurry polymerisation stage then hydrogen is added to the slurry reactor so that the molar ratio of hydrogen to ethylene in the reaction phase is from 0.1 to 1.0 mol/kmol, and preferably from 0.2 to 0.7 mol/kmol. Comonomer may then also be introduced into the slurry polymerisation stage in a desired molar ratio of comonomer to ethylene. If the high molecular weight ethylene polymer is produced in slurry polymerisation stage then hydrogen is added to the slurry reactor so that the molar ratio of hydrogen to ethylene in the reaction phase is at most 0.1 mol/kmol, preferably from 0.01 to 0.07 mol/kmol. Comonomer, if present, is introduced into the slurry polymerisation stage in a desired molar ratio of comonomer to ethylene.

The polymerisation may also be conducted in gas phase. In a fluidised bed gas phase reactor an olefin is polymerised in the presence of a polymerisation catalyst in an upwards moving gas stream. The reactor typically contains a fluidised bed comprising the growing polymer particles containing the active catalyst located above a fluidisation grid.

Where the higher molecular weight component is made as a second step in a multistage polymerisation it is not possible to measure its properties directly. However, e.g. for the above described polymerisation process of the present invention, the density, $MFR_2$ etc of the HMW component can be calculated using Kim McAuley's equations. Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835. The density is calculated from McAuley's equation 37, where final density and density after the first reactor is known. $MFR_2$ is calculated from McAuley's equation 25, where final $MFR_2$ and $MFR_2$ after the first reactor is calculated.

Prepolymerisation may precede the actual polymerisation step(s), as well known in the field. Then the ZN catalyst is fed to the prepolymerisation step and after said step the obtained reaction mixture together with the catalyst is then fed to the actual polymerisation step(s).

When a multimodal ZN polyethylene is produced, then e.g. slurry, solution or loop-gas phase reactor system which is well known as Borealis technology, i.e. as a BORSTAR™ reactor system (disclosed e.g. in EP517868), are preferable.

Preferred single stage or multistage process is carried out in slurry or solution process.

Examples for solution processes, reactors and catalyst are described i.a. in Process/reactor references: CA2368646, EP969916, CA2193431, U.S. Pat. No. 6,111,156, and in catalyst/process: EP6006303, U.S. Pat. No. 6,867,160, EP1124864, U.S. Pat. No. 6,723,677, WO93/07189, U.S. Pat. No. 6,878,658, EP949280, U.S. Pat. No. 5,519,098 and US2008/0051534. The SCLAIRTECH™ technology has been described e.g. in Handbook of Petrochemicals Production Processes, Robert A. Meyers, 2005 McGraw-Hill Companies, Inc, see Chapter 14.10, pages 14.131-14.138.

Homogenisation and Pelletisation

The ZN polyethylene from the polymerisation is usually homogenised and typically pelletised using a method known in the art to result in the Polymer composition. As well known, conventional additives, such as antioxidants can be added to the ZN polyethylene. Preferably, a twin screw extruder is used. Such extruders are known in the art and they can be divided in co-rotating twin screw extruders, as disclosed in WO-A-98/15591, and counter-rotating twin screw extruders, as disclosed in EP-A-1600276 In the co-rotating twin screw extruder the screws rotate in the same direction whereas in the counter-rotating extruder they rotate in opposite directions. An overview is given, for example, in Rauwendaal: Polymer Extrusion (Hanser, 1986), chapters 10.3 to 10.5, pages 460 to 489.

To ensure sufficient homogenisation of the Polymer composition during the extrusion the specific energy input must be on a sufficiently high level, but not excessive, as otherwise degradation of polymer and/or additives would occur. The required SEI level depends somewhat on the screw configuration and design and are within the skills of the skilled person. Suitable levels of specific energy input (SEI) are from 100 to 300 kWh/ton, preferably from 130 to 270 kWh/ton.

Polymer Composition

The Polymer composition of the invention comprises typically at least 50 wt % of the ZN polyethylene, preferably from 80 to 100 wt % and more preferably from 85 to 100 wt %, based on the total weight of the composition. The preferred Polymer composition consists of ZN polyethylene as the sole polymer component. The expression means that the Polymer composition does not contain further polymer components, but the ZN polyethylene as the sole polymer component. However, it is to be understood herein that the Polymer composition may comprise further components other than polymer, such as additives which may optionally be added in a mixture with a carrier polymer, i.e. in so called master batch.

The polymer composition may thus contain further additives such as additives conventionally used in crosslinked polymer applications. Part or all of the optional additives can be added e.g. to the ZN polyethylene before the above described homogenisation and preferable pelletisation step to obtain the Polymer composition. As an equal alternative, part or all of the optional additives can be added to the Polymer composition after the homogenization and preferable pelletisation step and optionally the Polymer composition is then further pelletised before the use in article preparation process. Also alternatively, part or all of the optional additives can be added to the Polymer composition in connection with the preparation process of an article thereof. The additives may be used in conventional amounts.

If, and preferably, free radical generating agent is used for crosslinking the formed article, then, preferably, the crosslinking agent contains —O—O— bond or —N=N— bond, more preferably is a peroxide, preferably organic peroxide, such as (2,5-dimethyl-2,5-di(tert-butylperoxy)hexyne-3,2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof, preferably 2,5-dimethyl-2,5-di(tert-butylperoxy)hexyne-3 (Trigonox 145-E85, supplier Akzo Nobel), however without limiting thereto.

Further non-limiting examples of additive(s) for crosslinked polymer applications include antioxidant(s), stabiliser(s), such as heat or radiation stabilisers, scorch retardant agent(s), antiblock agents, processing aid(s), acid scavenger(s), crosslinking booster(s), filler(s), such as carbon black or colorants.

Suitable antioxidants and stabilizers are, for instance, sterically hindered phenols, phosphates or phosphonites, sulphur containing antioxidants, alkyl radical scavengers, aromatic amines, hindered amine stabilizers and the blends containing compounds from two or more of the abovementioned groups.

In case the polymer composition contains carbon black, then preferably the amount of carbon black is less than 13 wt %, more preferably less than 10 wt %.

Preferably the Polymer composition is without any further components which are added to provide carbon-carbon double bonds, more preferably without any further components which are added to increase the crosslinking efficiency, such as crosslinking boosters.

Crosslinked Article and the Production Thereof

The article can be any, e.g. any conventional article, particularly a pipe, which can be produced e.g. according to the methods known in the art using the polymer composition as described above. Crosslinking of the article may be carried out during the compounding step of the Polymer composition before the formation of the article or during or after the formation of the article. The crosslinking is preferably effected by radical reaction.

Accordingly, the invention also provides a process for producing an crosslinked article, which process comprises steps of a) forming an article by using the Polymer composition as defined above and below, or in claims, and
b) crosslinking the article obtained from step a), preferably by radical reaction.

The step a) of the process of the invention is preferably carried out by
providing the Polymer composition of the invention as defined above or below in claims,
mixing, preferably meltmixing in an extruder, the Polymer composition optionally together with further components, such as further polymer components and/or additives, and
forming an article using the obtained mixture, preferably the obtained meltmix, of the Polymer composition.

Melt mixing means mixing above the melting point of at least the major polymer component(s) of the obtained mixture and is preferably carried out in a temperature of 20-25° C. above the melting or softening point of polymer component(s). Preferably, said Polymer composition is used in form of pellets or powder when provided to the step a). The additives may be added before or in connection with the article manufacturing process. The processing temperatures and devices are well known in the art, e.g. conventional mixers and extruders, such as single or twins screw extruders, are suitable for the process of the invention.

It is preferred that the meltmix of the Polymer composition obtained from step a) and crosslinked in step b) consists of ZN polyethylene as the sole polymer component. However, it is to be understood herein that the melt mix of Polymer composition may comprise further components such as additives which optionally have been added to Polymer composition as a mixture with a carrier polymer, i.e. in a form of so-called master batch.

The crosslinking step b) of the process of the invention is preferably carried out by irradiation or by using a free radical generating agent, which is preferably a peroxide as defined above. Usable manufacturing and crosslinking processes and devices are known and well documented in the literature.

The crosslinking of step b) may be carried out in connection with the production line of the article during the formation of the article or as a subsequent step and optionally in a different equipment following the article formation equipment, whereafter the crosslinked article is recovered. Alternatively, the crosslinking of step b) may be carried out outside the production line of the article, whereby the article formed in step a) is recovered and the crosslinking step b) of the recovered article is carried out later e.g. at the end use location.

Irradiation crosslinking is typically carried out in a conventional manner by irradiating the formed article electron beam, gamma-ray and other known radiation cure systems, preferably firing an electron beam onto the formed article. The dose used can vary e.g. in typical doses, such as 100 to 200 kGy, e.g. 120 to 200 kGy Particular doses of interest are 125 kGy, 160 kGy and 190 kGy.

More preferably in step b) the article obtained from step a) is crosslinked in the presence of a free radical generating agent, which is preferably a peroxide, as defined above. The free radical generating agent, preferably a peroxide as defined above, can be present in the Polymer composition, e.g. present in the pellets or powder of the Polymer composition, before the Polymer composition is introduced to step a), or the free radical generating agent can be added to the Polymer composition during the step a) e.g. during the mixing step preceding the article formation.

The crosslinking using a free radical agent is typically carried out at an elevated temperature. Typically the crosslinking temperature is at least 20° C. higher than the temperature used in meltmixing step and can be estimated by a skilled person.

The invention further provides a crosslinked article which is obtainable by the article preparation process as defined above or claims. The expression "obtainable by the process" means the category "product by process", i.e. that the product has a technical feature which is due to the preparation process.

The invention further provides independently a crosslinked first article comprising a crosslinked polymer composition which comprises a crosslinked ethylene polymer, wherein the ethylene polymer is obtainable by polymerising ethylene optionally together with one or more comonomer(s) in the presence of a Ziegler-Natta catalyst
and wherein the article has a crosslinking degree expressed as a gel content of at least 50 wt % (ASTM D 2765-01, Method A, decaline extrraction), when measured from a crosslinked Polymer composition sample taken from the crosslinked article.

The invention further provides independently a second crosslinked article comprising a crosslinked polymer composition which comprises a crosslinked ethylene polymer, wherein the ethylene polymer is obtainable by polymerising ethylene optionally together with one or more comonomer (s) in the presence of a Ziegler-Natta catalyst
and wherein the polymer composition has a crosslinking degree expressed as a gel content of at least 50 wt % (ASTM D 2765-01, Method A, decaline extraction), when measured from a disc sample consisting of the crosslinked Polymer composition. It is evident that in this invention the gel content defines the crosslinking property of the polymer composition used for preparing the article and it is measured from the sample of the polymer composition. I.e. it is not measured from a sample of the crosslinked polymer composition taken from the crosslinked article, as is the case in the crosslinked first article.

The Polymer composition, preferably the ethylene polymer, of the first and second crosslinked article preferably contains carbon-carbon double bonds, preferably in an amount of more than 0.2 carbon-carbon double bonds/1000 carbon atoms measured by FT IR, preferably of at least 0.3 carbon-carbon double bonds/1000 carbon atoms, preferably of at least 0.4 carbon-carbon double bonds/1000 carbon atoms, more preferably of at least 0.5 carbon-carbon double bonds/1000 carbon atoms, more preferably, wherein the ethylene polymer contains of at least 0.19 vinyl groups/1000 carbon atoms, preferably of at least 0.2 vinyl groups/1000 carbon atoms, preferably of at least 0.3 vinyl groups/1000 carbon atoms, preferably of at least 0.4 vinyl groups/1000 carbon atoms, more preferably of at least 0.5 vinyl groups/1000 carbon atoms, when measured by FT IR.

The invention further provides independently a third crosslinked article comprising a crosslinked polymer composition which comprises a crosslinked ethylene polymer,
wherein the ethylene polymer is obtainable by polymerising ethylene optionally together with one or more comonomer(s) in the presence of a Ziegler-Natta catalyst
and wherein the polymer composition, preferably the ethylene polymer, prior to crosslinking
contains carbon-carbon double bonds, preferably in an amount of more than 0.2 carbon-carbon double bonds/ 1000 carbon atoms measured by FT IR, preferably of at least 0.3 carbon-carbon double bonds/1000 carbon atoms, preferably of at least 0.4 carbon-carbon double bonds/1000 carbon atoms, more preferably of at least 0.5 carbon-carbon double bonds/1000 carbon atoms, more preferably, wherein the ethylene polymer contains of at least 0.19 vinyl groups/1000 carbon atoms, preferably of at least 0.2 vinyl groups/1000 carbon atoms, preferably of at least 0.3 vinyl groups/1000 carbon atoms, preferably of at least 0.4 vinyl groups/1000 carbon atoms, more preferably of at least 0.5 vinyl groups/1000 carbon atoms, when measured by FT IR. Moreover, the polymer composition of the crosslinked third article of the invention has preferably a crosslinking degree expressed as a gel content of at least 50 wt % (ASTM D 2765-01, Method A, decaline extraction), when measured from a disc sample consisting of the crosslinked Polymer composition.

The crosslinked article defined by process and the first, second and third crosslinked article invention defined by means of properties are commonly referred herein as Crosslinked article, unless otherwise specified, and may independently have the following preferred properties.

Preferably the Crosslinked article, preferably at least the crosslinked third article of the invention, comprises a crosslinked Polymer composition comprising a crosslinked ZN polyethylene, wherein the ZN polyethylene prior to crosslinking
contains of at least 0.2 vinyl groups per chain, preferably of at least 0.3, preferably of at least 0.5, more preferably of at least 0.7, more preferably of at least 0.8, even more preferably of at least 0.9, vinyl groups/chain, when determined according to "Amount of Unsaturation" as described under "Determination Methods".

The Polymer composition of the Crosslinked article, i.e. used in the article has preferably a gel content of at least 60 wt %, more preferably of at least 70 wt %, according to ASTM D2765-95 Method A (decaline extraction), when measured from a disc sample consisting of the crosslinked Polymer composition. In some Crosslinked article embodiments a gel content of at least 80 wt % according to ASTM D2765-95 Method A (decaline extraction), when measured from a disc sample consisting of the crosslinked Polymer composition is even more preferred.

More preferably the Crosslinked article, preferably the crosslinked third article, comprises a polymer composition which has preferably
a gel content of at least 60 wt %, preferably of at least 70 wt %, more preferably of at least 80 wt %, according to ASTM D2765-95 Method A (decaline extraction), when measured from a disc sample consisting of the Polymer composition which is crosslinked using 0.4 wt % peroxide based on the weight of the polymer composition, more preferably has
a gel content of at least 80 wt %, preferably at least 85 wt %, according to ASTM D2765-95 Method A (decaline extraction), when measured from a disc sample consisting of the Polymer composition which is crosslinked using 0.7 wt % peroxide based on the weight of the polymer composition,
even more preferably has
a gel content of at least 85 wt %, preferably at least 90 wt %, according to ASTM D2765-95 Method A (decaline extraction), when measured from a disc sample consisting of the Polymer composition which is crosslinked using 1.0 wt % peroxide based on the weight of the polymer composition. The used amount of the peroxide is taken from the product as sold by the supplier.

The ZN polyethylene of the preferred Crosslinked article has prior crosslinking a number average molecular weight (Mn) of at least 7000, preferably of at least 10 000 g/mol, preferably of at least 15 000 g/mol, more preferably of at least 20 000 g/mol, more preferably of at least 25 000 g/mol, more preferably of from 25 000 to 250 000 g/mol, more preferably from 26 000 to 200 000 g/mol. Depending on the desired end application the upper limit of Mn of the ZN polyethylene can be tailored to be of up to 150 000 g/mol, preferably of up to 100 000 g/mol.

The Polymer composition used in the Crosslinked article has preferably a maximum torque (Torque max, dNm,) of at least 5.0 dNm, preferably of at least 6.0 dNm, more preferably of at least 6.5 dNm, when measured according to Monsanto test using a disc sample consisting of the Polymer composition as described in "Gel content and torque" under "Determination methods". Upper limit is not limited and is preferably up to 30 dNm.

The crosslinked Polymer composition of the Crosslinked article preferably consists of ZN polyethylene as the sole crosslinkable polymer component, more preferably as the sole polymer component. However, it is to be understood herein that the Polymer composition may comprise further components such as additives which optionally have been added to Polymer composition as a mixture with a carrier polymer, i.e. in a form of so-called master batch.

More preferably, the crosslinked article, preferably the crosslinked Polymer composition is preferably without any further components which are added to provide carbon-carbon double bonds, more preferably without any further components which are added to increase the gel content of the crosslinked article.

As shown above, the Crosslinked article of the invention has good mechanical properties and thermal stability. Preferably, also the volatile and semi-volatile organic compounds (FOG/VOC) are at desirable low level. Preferably, also the taste and odour properties are advantageous.

Moreover, according to the present invention the preferable absence of very low molecular weight tail in ZN polyethylene results in highly advantageous crosslinkability.

It is naturally understood that the crosslinked Polymer composition, more preferably the crosslinked ZN polyethylene, has the preferable subranges, properties and embodiments as defied above.

According to a preferred embodiment of the Crosslinked article is crosslinked by irradiation and is the independent crosslinked first article, preferably the independent crosslinked second article, more preferably the independent crosslinked third article, as defined above including the preferable embodiments thereof. In this embodiment irradiation, the ZN polyethylene prior crosslinking has preferably an $MFR_2$ of from 0.01 to 5.0 g/10 min, preferably of 0.05 to 2.0 g/10 min, preferably from 0.2 to 1.4 g/10 min. Preferably the $MFR_5$ value is in the range 0.1 to 2 g/10 min. $MFR_{21}$ is preferably of less than 40.0 g/10 min, preferably of less than 2 to 35 g/10 min, more preferably less than 20 g/10 min, especially 5 to 20 g/10 min.

According to the equally preferred embodiment the Crosslinked article is crosslinked using at least one free radical generating agent, preferably one or more peroxide(s) as defined above, and is the independent crosslinked first article, preferably the independent crosslinked second article, more preferably the independent crosslinked third article, as defined above including the preferable embodiments thereof. In this embodiment the ZN polyethylene prior crosslinking has preferably an $MFR_2$ of from 0.01 to 5.0 g/10 min, preferably of 0.05 to 2.0 g/10 min, preferably from 0.2 to 1.4 g/10 min. $MFR_{21}$ of less than 40.0 g/10 min, preferably from 2 to 35.0 g/10 min and more preferably from 3 to 25 g/10 min. $FRR_{21/5}$ is preferably of up to 50, preferably of from 2 to 35, more preferably of from 10 to 30.

Peroxide Crosslinked artice is the most preferred Crosslinked article of the invention.

Determination Methods

Unless otherwise stated the following methods were used for determining the properties of the PE copolymer as given in the description or in the experimental part and claims below.

Wt %=% by weight.

Melt Index

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is a measure of the shear thinning and denotes the ratio of flow rates at different loads. Thus, $FRR_{21/2}$ denotes the value of $MFR_{21}/MFR_2$. FRR is influenced by the molecular weight distribution and the branching structure of the polymer.

Comonomer Content (NMR)

The comonomer content was determined by quantitative nuclear magnetic resonance (NMR) spectroscopy, 13C-NMR, after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). The 13C-NMR spectra were recorded on Bruker 400 MHz spectrometer at 130° C. from samples dissolved in 1,2,4-trichlorobenzene/benzene-d6 (90/10 w/w). Quantities were calculated using simple corrected ratios of the signal integrals of representative sites in a manner known in the art.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend, $w_i$ is the weight fraction of component "i" in the blend and $\rho_i$ is the density of the component "i".

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4: 2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Amount of Unsaturation

1. Quantification of the Amount of Carbon-Carbon Double Bonds by IR Spectroscopy Quantitative infrared (IR) spectroscopy was used to quantify the amount of carbon-carbon doubles (C═C). Calibration was achieved by prior determination of the molar extinction coefficient of the C═C functional groups in representative low molecular weight model compounds of known structure.

The amount of each of these groups (N) was determined as number of carbon-carbon double bonds per thousand total carbon atoms (C═0/1000C) via:

$$N=(A\times14)/(E\times L\times D)$$

were A is the maximum absorbance defined as peak height, E the molar extinction coefficient of the group in question (l·mol-1·mm-1), L the film thickness (mm) and D the density of the material (g·cm-1).

For polyethylenes three types of C═C containing functional groups were considered, each with a characteristic absorption and each calibrated to a different model compound resulting in individual extinction coefficients:

vinyl (R—CH═CH2) via 910 cm-1 based on 1-decene [dec-1-ene] giving E=13.13 l·mol-1·mm-1 vinylidene (RR'C═CH2) via 888 cm-1 based on 2-methyl-1-heptene [2-methylhept-1-ene] giving E=18.24 l·mol-1·mm-1 trans-vinylene (R—CH═CH—R') via 965 cm-1 based on trans-4-decene [(E)-dec-4-ene] giving E=15.14 l·mol-1·mm-1

For polyethylenes linear baseline correction was applied between approximately 980 and 840 cm-1.

For polyethylene samples solid-state infrared spectra were recorded using a FTIR spectrometer (Perkin Elmer 2000) on compression moulded thin (0.5-1.0 mm) films at a resolution of 4 cm-1 and analysed in absorption mode with.

2. Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 cm-1.

The molar extinction coefficient (E) was determined as l·mol-1·mm-1 via:

$$E=A/(C\times L)$$

were A is the maximum absorbance defined as peak height, C the concentration (mol·l-1) and L the cell thickness (mm).

At least three 0.18 mol·l-1 solutions in carbondisulphide (CS2) were used and the mean value of the molar extinction coefficient used.

3. The Amount of Vinyl Groups/Chain

The chain length (CL), defined as units ethylene per chain, is calculated using Mn measured as defined under molecular weight.

Chain length=Mn/28.

The Vinyl content C═C/100° C. (VIN) is measured using FT-IR as described under (1.) and (2.). The amount of vinyl groups/chain is calculated:

(CL·2·VIN)/1000=vinyl groups per chain.

Volatile and Semi-Volatile Organic Compounds, FOG and VOC Analysis

VOC (Volatile Organic Compounds)/FOG (Fumes produced at given temperature) analysis was based on VDA 278 with below given modifications:

VDA 278 requires direct desorption (using heat flow and flow of inert gas) for VOC/FOG analysis. Volatile and semi-volatile organic compounds are extracted from the sample into a inert gas stream and are then re-focused onto a secondary trap prior to injection into a GC(MS). A CIS-System connected to a GC 6890 from (supplier Agilent) and an automated thermal desorber, Gerstel TDSA (supplier Gerstel), were used. Carrier-Gas: Helium 5.0. Column: 50 m×0.32 mm, 0.52 μm 5% Phenyl-Methyl-Siloxane HP Ultra 2.

1) VOC analysis: is done acc device-setting 1 listed in the standard using following main parameters: The sample is desorbed at 90 deg for 30 minutes to extract volatile organic compounds ranging up to n-C20. This is followed by semi-quantitative analysis of each compound as μg toluene equivalents per gram of sample Flow-Mode: splitless. Final Temperature: 90° C.; final Time: 30 min; rate: 60K/min Cooling-trap: Flow-mode split: 1:30. Temperature Range: −150° C.-+280° C.; rate: 12 K/sec; final time: 5 min.

GC-settings: 40° C., 2 min, isotherm 3 K/min up to 92° C.; 5 K/min up to 160° C.; 10 K/min up to 280° C., 10 minutes isotherm, flow: 1.3 ml/min.

2) FOG analysis. is done acc device-setting 1 listed in the standard using following main parameters: The same sample is further desorbed to 120 deg for 60 minutes to extract semi-volatile organic compounds ranging from n-C16 to n-C32. This is followed by semi-quantitative analysis of each compound as μg n-hexadecane equivalents per gram of sample.

Flow-mode: splitless. Rate: 60K/min; final temperature: 120° C.; final time: 60 min Cooling trap: Flow-mode split: 1:30. Temperature Range: −150° C.-+280° C.; rate: 12 K/sec.

GC-settings: 50° C., 2 min, isotherm 25 K/min up to 160° C.; 10 K/min up to 280° C., 30 minutes isotherm, flow: 1.3 ml/min.

The quantification was done with an GC-MS 5973 Instrument (supplier Aglient)

The unit: VOC: in μg toluene equivalent/g, FOG: in μg hexadecane equivalent/g.

Gel Content and Torque

The gel content and torque are two independent measurements with independent results and can be made separately. For the sake of convenience, in this application both measurements were made during the same test run.

Gel content is measured according to ASTM D 2765-01, Method A using decaline extraction. In the description and claims the gel content definition and data of the polymer composition is given by measuring the gel content from a disc sample of the crosslinked Polymer composition as described below or from a crosslinked Polymer composition sample taken from a crosslinked article, as stated specifically in the context. In case of an irradiation crosslinked article, the gel content of the polymer composition is defined herein by measuring it from said disc sample or from a pipe sample prepared and irradiation crosslinked as described below. The sample used in the gel content definition is specifically stated in the context.

1. Gel Content and Torque Measurement from a Disc Sample

Unless otherwise stated the disc samples of the polymer composition were crosslinked using 0.4 wt % peroxide, preferably of 2,5-dimethyl-2,5-di(tert-butylperoxi)hexyn-3.

Procedure herein for adding the peroxide: The polymer composition, if in form of pellets, were grinded to powder and were sieved before use. Only particles smaller than 2.0 mm in diameter were included. The powder is put into a glass bottle and shaken and to each sample, unless otherwise stated, 0.4 wt % of 2,5-dimethyl-2,5-di(tert-butylperoxi) hexyn-3 (Trigonox 145 E85, 85 wt % solution of peroxide in oil, supplied by Akzo Nobel) was added drop by drop. The total sample weight was 100 g.

Soaking was performed by rotation of samples during 20 h in a Heraeus Instruments rotation oven at room temperature.

Disc preparation: After soaking, the polymer powder was compression moulded into circular discs (Ca: 3 mm thick. Diameter: 40 mm). in a Specac compression moulding machine. This was done at a temperature of 122° C., under a pressure of 5 kPa for 2 minutes, followed by cooling for 2 minutes under the same pressure.

The cross-linking and at the same time the torque test, T, was performed in a Monsanto Rheometer (MDR 2000 E), an instrument which measures the torque (Nm or dNm) vs. time by oscillating movements (0.5 degrees with a moving frequency of 50 times per minute in air atmosphere) and it is therefore possible to study at what time the cross-linking starts and to what degree it is achieved. Measurements were performed for 5 minutes at 200° C., on two disc samples from each material.

The Torque results were obtained and determined from the above Monsanto Rheometer testing of 5 min. The parameter T90 (min) is the time it takes to reach 90% of the final torque value (Torque max, dNm) achieved after complete measuring time, in this case 5 min.

The gel content (Degree of crosslinking, XL, %) was determined from the disc samples of the material obtained from the above 5 minutes Rheometer testing. The gel content determination was performed according to ASTM D 2765-01, Method A using decaline extraction

2. Irradiation Crosslinked Pipe Sample for Gel Content Determination

Pellets of the polymer composition was used for preparing the pipe sample. If the polymer composition was in powder form, then it was compounded and pelletised in a Buss 100 mm machine. Pipe extrusion was carried out in a Battenfeld extruder using a standard PE screw with a line speed of around 1 m/min into a diameter 32 mm pipe with wall thickness of 3 mm.

Melt temperature was in the range 200 to 230° C. Irradiation of pipes was carried out by electron beam at room temperature in air using a dose of 160 kGy or 190 kGy, as stated in the context. One Gy corresponds to an energy absorption of 1 Joule/kg. The pipe sample was used in the method A of the gel content measurement according to ASTM D 2765-01.

EXPERIMENTAL PART

Inventive Example 1

LLDPE 1: commercially available Ziegler-Natta polyethylene copolymer, SCLAIR® FP026-F Comonomer: 1-octene, density of 926 kg/m$^3$, MFR$_2$ of 0.8 g/10 min, supplier Nova Chemicals.

Inventive Example 2

LLDPE 2: commercially available Ziegler-Natta polyethylene copolymer, SCLAIR® FP120-A Comonomer: 1-octene, density of 920 kg/m$^3$, MFR$_2$ of 1.0 g/10 min, supplier Nova Chemicals.

Ash content analysis can be used and was used herein to verify that the SCLAIR grades of Inv. Ex1 and Inv. Ex 2 were produced using ZN based catalyst system.

Inventive Example 3

Preparation of Bimodal LLDPE Using Ziegler-Natta Catalyst

Preparation of the Catalyst:

Complex preparation: 87 kg of toluene was added into the reactor. Then 45.5 kg Bomag A in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid catalyst component preparation: 275 kg silica (ES747JR of Crossfield, having average particle size of 20 μm) activated at 600° C. in nitrogen was charged into a catalyst preparation reactor. Then, 411 kg 20% EADC (2.0 mmol/g silica) diluted in 555 liters pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg TiCl$_4$ was added during 0.5 hours at 45° C. The slurry was stirred at 40° C. for five hours. The catalyst was then dried by purging with nitrogen.

Polymerisation Process:

The ZN LLDPE used in the examples was produced in pilot plant multistage reaction comprising a prepolymerisation stage in slurry in a 50 dm$^3$ loop reactor at 80° C. in a pressure of 65 bar using the polymerisation catalyst prepared according to Example 1a and triethylaluminium cocatalyst. The molar ratio of aluminium of the cocatalyst to titanium of the catalyst was 20. Ethylene was fed in a ratio of (200 g of C2)/(1 g/catalyst). Propane was used as the diluent and hydrogen was feeded in amount to adjust the MFR2 of the prepolymer to about 10 g/10 min. The obtained slurry was transferred into a 500 dm$^3$ loop reactor, operated at 85° C. temperature and 60 bar pressure, was continuously introduced propane diluent, ethylene, hydrogen and 1-butene comonomer in such flow rates that ethylene content in the reaction mixture was 6.4 mol-%, the mole ratio of hydrogen to ethylene was 150 mol/kmol and the mole ratio of 1-butene to ethylene was 730 mol/kmol. The continuous feed of prepolymerised catalyst was adjusted in such quantities that ethylene polymer was produced at a rate of 28 kg/h. The polymer had an MFR$_2$ of 100 g/10 min and density of 946 kg/m$^3$.

The polymer was withdrawn from the loop reactor by using settling legs, and the polymer slurry was introduced into a flash tank operated at 3 bar pressure and 20° C. temperature.

From the flash tank the polymer was introduced into a fluidised bed gas phase reactor, which was operated at 80° C. temperature and 20 bar pressure. Into the gas phase reactor were additional ethylene, hydrogen and 1-butene introduced, as well as nitrogen flushes to keep the connections and piping open. Consequently, the concentration of ethylene in the reactor gas was 20 mol-%, the molar ratio of hydrogen to ethylene was 4 mol/kmol and the molar ratio of 1-butene to ethylene was 580 mol/kmol. The polymer was withdrawn from the reactor at a rate of 67 kg/h. After collecting the polymer it was blended with conventional additives (stabiliser and polymer processing aid) and extruded into pellets in a counterrotating twin-screw extruder JSW CIM90P. The resulting multimodal znLLDPE had an MFR$_2$ of 0.4 g/10 min and density of 923 kg/m$^3$. The split between the polymer produced in the loop reactor and the polymer produced in the gas phase reactor was 45/55.

Inventive Example 4

FG5190: commercially available Ziegler-Natta polyethylene copolymer, density 919 kg/m$^3$, MFR$_2$ 1.2 g/10 min, supplied by Borealis.

Ash content analysis can be used and was used herein to verify that the FG grade of Inv. Ex 4 was produced using ZN based catalyst system.

Inventive Example 5

Preparation of Unimodal HDPE Using Ziegler-Natta Catalyst

The unimodal Ziegler-Natta copolymer of ethylene with hexene was produced in a slurry loop reactor having a volume of 500 dm$^3$. Into the reactor isobutane as diluent, Ziegler Natta catalyst according to Example 3 of EP0688794, ethylene, 1-hexene and hydrogen were continuously introduced and polymerization at the loop reactor was operated at 96° C. and at an overall pressure of 60 bar. The reactor conditions and feeds were: ethylene concentration 7.5 mol %, 0.146 kg H2/ton ethylene, 40 kg 1-hexene/ton of ethylene, 40 ppm of TEAl and 10 ppm antistatic agent.

Reactor Polymer Properties:

| | |
|---|---|
| Density (in kg/m$^3$) | 945.0 |
| MFI (190/2.16) in g/10 min | 0.70 |
| MFI (190/21.6) in g/10 min | 17.3 |
| Melt point (in ° C.) | 131.2 |
| Comonomer content (in wt %) | 0.5 |
| Mn (in kDa) | 33 |
| Mw (in kDa) | 113 |
| Mw/Mn (in kDa) | 3.5 |

The obtained reactor polymer was mixed with 3000 ppm of Irganox B215 and 4000 ppm of Ca-stearate and then extruded to pellets in a counter-rotating twin screw extruder CIM90P (manufactured by Japan Steel Works) with SEI of 240 kwh/ton.

The final properties are taken from the polymer pellets: Density of 947.0 kg/m³ and MFR$_2$ of 0.6 g/min.

Inventive Example 6

SCLAIR® 14G: Density 936 kg/m³, C2/C4, MFR$_2$ 0.72 g/10 min, supplier Nova Chemicals.

Inventive Example 7

SCLAIR® 19A: Density 962 kg/m³, C2, MFR$_2$ 0.72 g/10 min supplier Nova Chemicals.

Ash content analysis can be used and was used herein to verify that the SCLAIR grades of Inv. Ex 6 and Inv. Ex 7 were produced using ZN based catalyst system.

Comparative Example 1

HE2591 commercially available Cr grade, supplier Borealis, properties given in table 1 (an existing commercial grade for crosslinked products as reference).

Inventive examples show surprisingly good crosslinking efficiency with different peroxide amounts which are comparable with the crosslinking efficiency of "reference" Cr grade of comparative example 1 used in prior art for crosslinking applications. Moreover, Inventive examples show very good mechanical properties expressed as torque. Also the volatiles and semi-volatiles content expressed as VOC an FOG are preferable low. The beneficial properties are demonstrated in the below tables.

In an embodiment, the polymer composition has at least one, preferably two or more, in any combination, more preferably all, of the following properties: (i) has prior crosslinking a number average molecular weight (Mn) of at least 7000, preferably of at least 10 000 g/mol, preferably of at least 15 000 g/mol, more preferably of at least 20 000 g/mol, more preferably of at least 25 000 g/mol, more preferably of from 25 000 to 250 000 g/mol, more preferably from 26 000 to 200 000 g/mol, (ii) is crosslinked by irradiation and the ethylene polymer has prior crosslinking an MFR.sub.2 of from 0.01 to 5.0 g/10 min, preferably of 0.05 to 2.0 g/10 min, preferably from 0.2 to 1.4 g/10 min and preferably an MFR.sub.21 of less than 40.0 g/10 min, preferably of less than 2 to 35 g/10 min, more preferably less than 20 g/10 min, especially 5 to 20 g/10 min, or is crosslinked using a free radical generating agent, preferably peroxide, and the ethylene polymer has prior crosslinking an MFR.sub.2 of from 0.01 to 5.0 g/10 min, preferably of 0.05 to 2.0 g/10 min, preferably from 0.2 to 1.4 g/10 min, and preferably an MFR.sub.21 of less than 40.0 g/10 min, preferably from 2 to 35.0 g/10 min and more preferably from 3 to 25 g/10 min, (iii) a volatile organic compounds (VOC) of less than 15, preferably of less than 12 and fumes produced at given temperature (FOG) of less than 15, preferably of less than 10 when measured as defined above under "Determination methods", or (iv) has a maximum torque (Torque max, dNm,) of at least 5.0 dNm, preferably of at least 6.0 dNm, more preferably of at least 6.5 dNm, when measured according to Monsanto test using a disc sample consisting of the Polymer composition as described in "Gel content and torque" under "Determination methods".

TABLE 1

Crosslinkability and VOC and FOG results of unsaturated ZN LLDPE

| Example | Density kg/m3 | MFR$_2$ (in g/10 min) | MFR$_{21}$ (in g/10 min) | Mn | Mw | MWD | Unsaturation Carbon-carbon double bonds/1000 carbon atoms* | Vinyl groups/ chain | VOC** | FOG*** | Gel content (in wt %) 0.4% peroxide | 0.7% peroxide | 1% peroxide |
|---|---|---|---|---|---|---|---|---|---|---|---|---|---|
| Inv. Ex. 1 | 926 | 0.8 | 22 | 28000 | 108000 | 3.8 | 0.66 | 1.1 | 8 | 10 | 82.2 | 92 | 94 |
| Inv. Ex. 2 | 920 | 1 | 25 | 27000 | 108000 | 4.1 | 0.74 | 1.1 | 8 | 10 | 75.7 | 87.7 | 92.1 |
| Inv. Ex. 3 | 923 | 0.4 | 40 | 14000 | 152000 | 10.6 | 0.40 | 0.2 | | | | 58.6 | 66.7 |
| Inv. Ex. 4 | 919 | 1.2 | | 29500 | 133000 | 4.5 | 0.21 | 0.3 | | | 60.6 | | |

*Total amount of Vinyl, Trans-vinylene and Vinylidene groups/1000 carbon atoms

**FOG = Fumes produced at given temperature, in μg toluene equivalent/ppm

***VOC = volatile organic compounds, in μg hexadecane equivalent/ppm

TABLE 2

Crosslinkability and Torque results of unsaturated ZN LLDPE

| Example | Density kg/m3 | MFR$_2$ (in g/10 min) | MFR$_{21}$ (in g/10 min) | Mn | Mw | MWD | Unsaturation Carbon-carbon double bonds/1000 carbon atoms* | Vinyl groups/ chain | 0.4% peroxide | Torque (in dNm) | T90 (in min) |
|---|---|---|---|---|---|---|---|---|---|---|---|
| Inv. Ex. 1 | 926 | 0.8 | 22 | 28000 | 108000 | 3.8 | 0.66 | 1.1 | 82.2 | 11.7 | 2.8 |
| Inv. Ex. 2 | 920 | 1 | 25 | 27000 | 108000 | 4.1 | 0.74 | 1.1 | 75.7 | 9.4 | 3.1 |
| Inv. Ex. 4 | 919 | 1.2 | | 29500 | 133000 | 4.5 | 0.21 | 0.3 | 60.6 | 6.8 | 6.8 |

TABLE 3

Unsaturation calculation

| The amount and type of double bonds in the polymer/examples no. | Trans-vinylene groups/1000 Carbon atoms | Vinyl groups/1000 Carbon atoms | Vinylidene groups/1000 Carbon atoms | Carbon-carbon double bonds/1000 carbon atoms* | Chain lenght [units ethylene] basis | N: o carbons/chain | Vinyvinyl groups/chain (SEC) |
|---|---|---|---|---|---|---|---|
| Inv. Ex. 1 | 0.02 | 0.56 | 0.08 | 0.66 | 1000 | 2000 | 1.1 |
| Inv. Ex. 2 | 0.07 | 0.55 | 0.12 | 0.74 | 964 | 1929 | 1.1 |
| Inv. Ex. 3 | 0.07 | 0.23 | 0.10 | 0.40 | 500 | 1000 | 0.2 |
| Inv. Ex. 4 | 0.04 | 0.13 | 0.04 | 0.21 | | | 0.3 |
| Inv. Ex. 5 | 0.10 | 0.22 | 0.03 | 0.35 | 1575 | 3150 | 0.7 |
| Inv. Ex. 6 | 0.19 | 0.88 | 0.08 | 1.15 | 321 | 643 | 0.6 |
| Inv. Ex. 7 | 0.04 | 0.82 | 0.06 | 0.92 | 286 | 571 | 0.5 |

*Total amount of Vinyl, Trans-vinylene and Vinylidene groups/1000 carbon atoms

TABLE 4

Crosslinkability and Torque results of unsaturated ZN MDPE/HDPE

| Example | Density kg/m3 | MFR$_2$ (in g/10 min) | MFR$_{21}$ (in g/10 min) | Mn | Mw | MWD | Unsaturation Carbon-carbon double bonds/1000 carbon atoms* | Vinyl groups/chain | Gel content (in wt %) 0.4% peroxide | Torque max (in dNm) | T90 (in min) |
|---|---|---|---|---|---|---|---|---|---|---|---|
| Inv. Ex. 5 | 947 | 0.6 | | 44100 | 131000 | 3.0 | 0.35 | 0.7 | 70.4 (M.P) | 9 | 3.1 |
| Inv. Ex. 6 | 936 | 0.72 | | 9000 | 138000 | 15 | 1.15 | 0.6 | 54.0 | 5.4 | 3.3 |
| Inv. Ex. 7 | 962 | 0.72 | | 8000 | 122000 | 16 | 0.92 | 0.5 | 52.6 | 5.1 | 3.3 |
| Comp. Ex. 1 | 944 | 0.1 | 10 | 24000 | 184000 | 7.5 | 0.75 | 1.2 | 85.00 | | |

*Total amount of Vinyl, Trans-vinylene and Vinylidene groups/1000 carbon atoms

The invention claimed is:

1. A process for the preparation of a crosslinked article comprising:
   (I) polymerising ethylene optionally together with one or more comonomer(s) in the presence of a Ziegler-Natta catalyst as the sole catalyst, so as to form an ethylene polymer which is an ethylene homopolymer or a copolymer of ethylene with one or more C4-12 alpha-olefin comonomers containing carbon-carbon double bonds in an amount of more than 0.5 carbon-carbon bonds/1000 carbon atoms measured by FTIR, wherein said polymerisation is carried out without using any polyunsaturated comonomers;
   (II) making a polymer composition comprising at least 50 wt % of said ethylene polymer, wherein said polymer composition has a crosslinkability expressed as a gel content of at least 80 wt % when measured from a disc sample of the crosslinked ethylene polymer (ASTM D 2765-01, Method A, decaline extraction);
   (III) forming an article consisting of said polymer composition of step (II);
   (IV) crosslinking the article obtained from step (III).

2. The process according to claim 1, wherein the article is crosslinked by irradiation or by using a free radical generating agent.

3. A crosslinked article which is obtained by the process as defined in claim 1.

4. A crosslinked article comprising a crosslinked polymer composition, said polymer composition comprising, before cross-linking, at least 50 wt % of an ethylene polymer, wherein the ethylene polymer is obtained by polymerising ethylene optionally together with one or more comonomer(s) in the presence of a Ziegler-Natta catalyst as the sole catalyst, wherein said polymerisation is carried out without using any polyunsaturated comonomers; wherein the ethylene polymer is an ethylene homopolymer or a copolymer of ethylene with one or more C4-12 alpha-olefin comonomers and contains carbon-carbon double bonds in an amount of more than 0.5 carbon-carbon double bonds/1000 carbon atoms measured by FTIR; and wherein the polymer composition has a crosslinkability expressed as a gel content of at least 80 wt % when measured from a disc sample of the crosslinked polymer composition (ASTM D 2765-01, Method A, decaline extraction).

5. The crosslinked article according to claim 4, wherein the ethylene polymer prior to crosslinking contains at least 0.2 vinyl groups per chain, when measured according to "Amount of Unsaturation" as described under "Determination methods".

6. The crosslinked article according to claim 4, wherein the polymer composition has at least one of the following properties:
   (i) has prior crosslinking a number average molecular weight (Mn) of at least 7000 g/mol,
   (ii) is crosslinked by irradiation and the ethylene polymer has prior crosslinking an MFR$_2$ of from 0.01 to 5.0 g/10 min, or is crosslinked using a free radical generating agent and the ethylene polymer has prior crosslinking an MFR$_2$ of from 0.01 to 5.0 g/10 min,
   (iii) a volatile organic compounds (VOC) of less than 15, and fumes produced at given temperature (FOG) of less than 15, when measured as defined under "Determination methods", or
   (iv) has a maximum torque (Torque max, dNm,) of at least 5.0 dNm, when measured according to Monsanto test using a disc sample consisting of the Polymer composition as described in "Gel content and torque" under "Determination methods".

7. The crosslinked article of claim 4 wherein the article is crosslinked using free radical generating agent.

8. The crosslinked article of claim 4 wherein the article is crosslinked by irradiation.

9. The process according to claim 1, wherein the ethylene polymer contains at least 0.2 vinyl groups per chain when determined according to "Amount of Unsaturation" as described under "Determination Methods".

10. The process according to claim 1, wherein the ethylene polymer is selected from:
  elastomers (POE), plastomers (POP) or a very low density ethylene copolymers (VLDPE) which cover the density range of from 855 to 909 kg/m$^3$,
  linear low density ethylene copolymers (LLDPE) having a density of from 910 to 930 kg/m$^3$,
  medium density ethylene copolymers (MDPE) having a density of from 931 to 945 kg/m$^3$, or
  high density polyethylenes (HDPE) which are selected form ethylene homo- or copolymers and have a density of more than 946 kg/m$^3$.

11. The process according to claim 1, wherein the ethylene polymer has at least one of the following properties:
  (i) is unimodal or multimodal with respect to molecular weight distribution (MWD),
  (ii) has an MFR$_2$ of from 0.01 to 200.0 g/10 min,
  (iii) has an MFR$_{21}$ of less than 50.0 g/10 min,
  (iv) has a number average molecular weight (Mn) of at least 7000 g/mol, or
  (v) has a weight average molecular weight (Mw) of at least 35 000 g/mol.

* * * * *